June 23, 1964  E. O. RODRIGUEZ  3,138,347

AIRCRAFT AND CONTROL MEANS THEREFOR

Filed Sept. 7, 1961  5 Sheets-Sheet 1

INVENTOR
EDUARDO OVALLE RODRIGUEZ

ATTORNEYS

INVENTOR
EDUARDO OVALLE RODRIGUEZ
ATTORNEYS

June 23, 1964     E. O. RODRIGUEZ     3,138,347
AIRCRAFT AND CONTROL MEANS THEREFOR
Filed Sept. 7, 1961     5 Sheets-Sheet 3
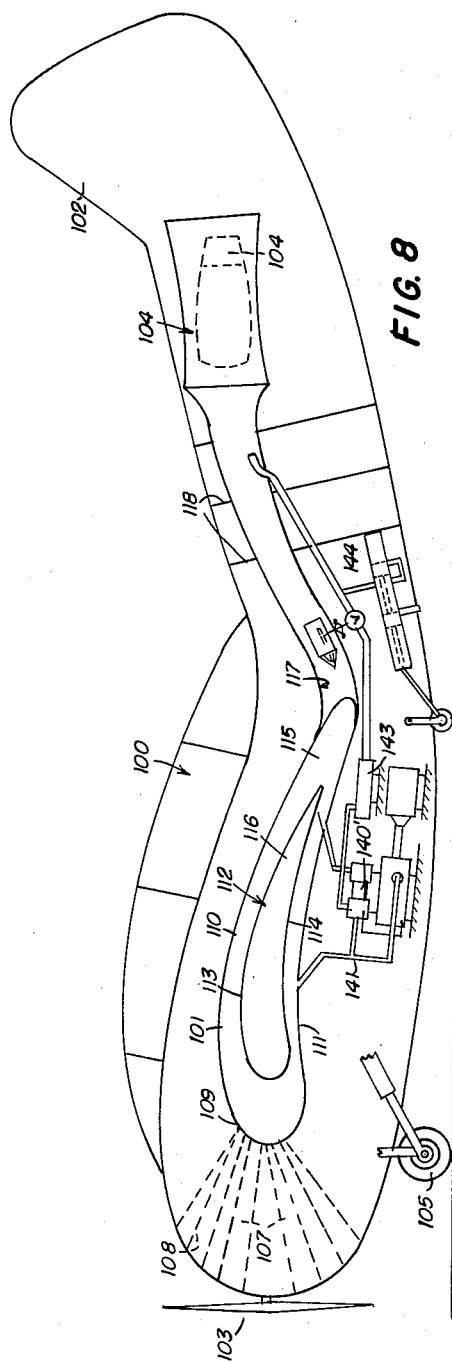
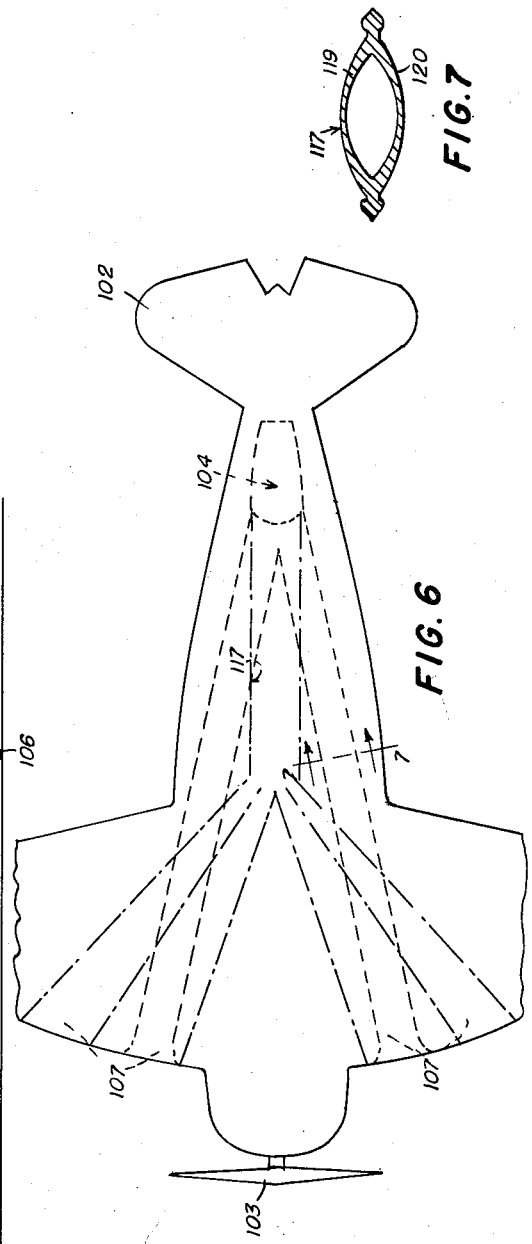
INVENTOR
EDUARDO OVALLE RODRIGUEZ
ATTORNEYS

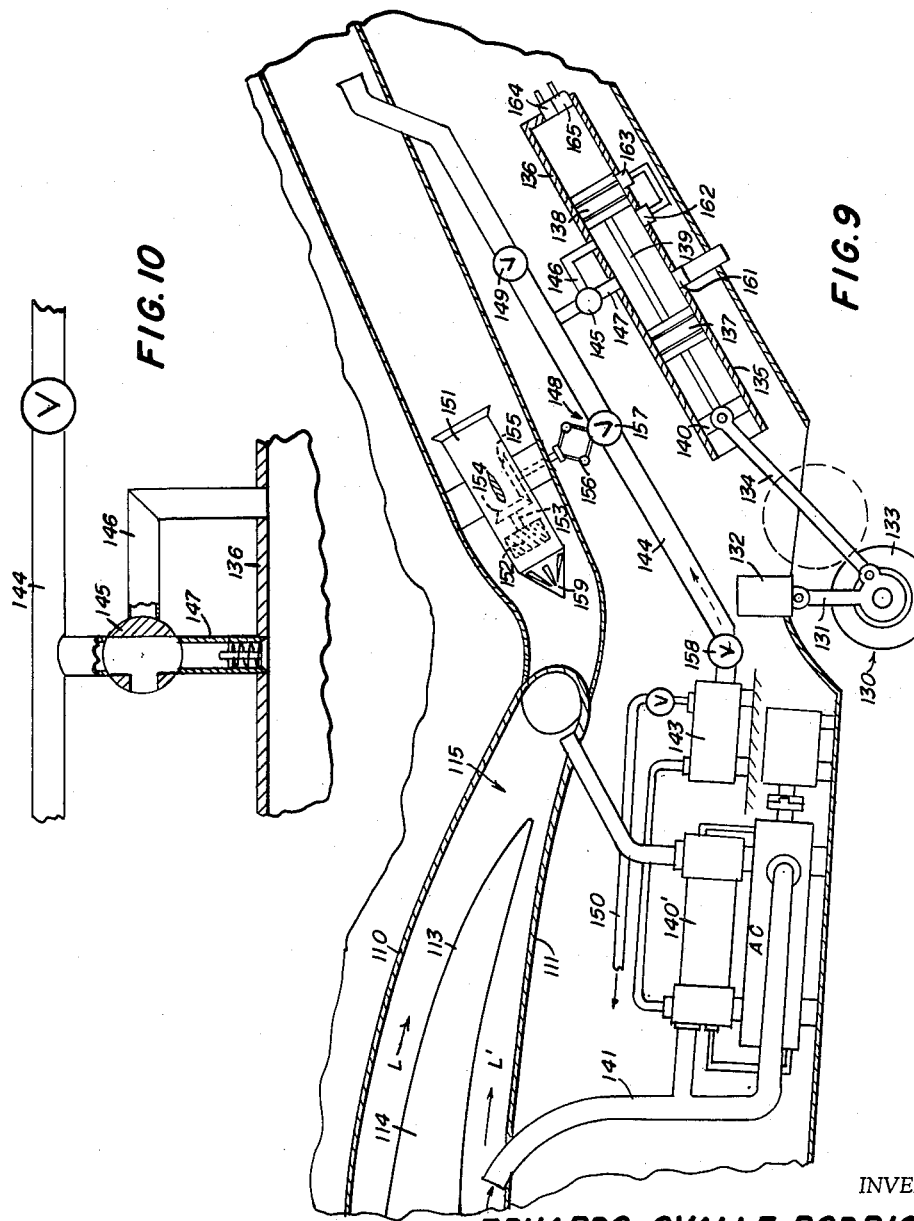

INVENTOR
*EDUARDO OVALLE RODRIGUEZ*

ATTORNEYS

United States Patent Office 3,138,347
Patented June 23, 1964

3,138,347
AIRCRAFT AND CONTROL MEANS THEREFOR
Eduardo Ovalle Rodriguez, Casilla 2108, Santiago, Chile
Filed Sept. 7, 1961, Ser. No. 136,559
4 Claims. (Cl. 244—12)

Broadly, the present invention relates to aircraft and control means therefor.

More specifically, the invention is directed to means for incorporation in any type of airplane which permits the control, at will, of the take-off speed or the landing speed, even when these respective operations are performed at very pronounced angles of attack, and which will also permit planes flying at normal cruising speeds to be able to effect a landing at a low speed, in emergency situations, thereby achieving the maximum safety factor which has been sought in the aviation industry.

The invention includes a combined means for aspirating atmospheric air and conduits or channels therefor provided through the wings and fuselage of the airplane, with such combination being so arranged as to function that the air aspirated at the forward area or zone of the airplane by virtue of its longitudinal movement through the conduits or channels in the direction of the tail of the airplane initiates a vertical force of sustentation which counterbalances the weight of the airplane, whether the airplane be stationary on the air strip or ground, moving forward prior to take-off, during normal substantially horizontal flight in the air, or during landing.

A salient object of the present invention is to incorporate with all types of aircraft, means to render the capacity of sustentation of the aircraft independent of the translation velocity of the aircraft.

At the present time these particular characteristics are related directly and proportionately result in the major proportion of airplane accidents.

It is believed apparent that the majority of airplane accidents are caused by the excessive relative speed with respect to the ground that airplanes must develop to initiate and maintain their capacity of sustentation force or anti-gravity force which is produced by the motion through the air of the aerodynamic profile of the wings, and this sustentation is identified hereinafter as A. As is well known, the sustentation force A increases proportionately to the sustentation surface F, and to the square of the speed of motion ($v$) in accordance with the following formula:

$$A = kFv^2$$

It will be appreciated that from this formula to increase the sustentation force A in an easier and cheaper fashion, it is necessary to increase the motion speed $v$ rather than the sustentation surface F. This solution to the problem has caused the manufacturers of airplanes to design and construct aircraft possessing high speeds, particularly during the take-off and landing operations which will allow the initiation and maintenance during such take-off and landing operations of an adequate value for the sustentation force A.

The danger resulting from such high speed shows up quite frequently in disasters effected by collisions during take-off, or by falls during landings, or when the aircraft strikes mountains, hills and the like.

Another particularly objectionable feature respecting these high speeds involves the excessively high cost of construction and maintenance of airports for allowing proper take-offs and landings.

Consequently, an airplane which is able to take off and fly and land by means of an arrangement which permits to make independent to a maximum degree, the sustentation force A from the motion speed $v$ will meet and satisfy the ideal safety conditions regarding the aforementioned hazards.

To understand fully the basic ideas of the present invention, reference is first made to the following universally accepted principles of aerodynamics:

(1) The sustentation force which maintains in the air and prevents the fall of an airplane of conventional type during normal flight is primarily initiated by the motion of the aerodynamic profiles of the wings through the molecular mass of air, since the upper surface of the wings is convex (of greater length) and the lower surface is generally concave (lesser length) in the direction of movement of the airplane, and such factors cause a decrease in the molecular concentration of the air stream moving along the upper surface, and an increase in the same concentration along the lower surface. As is known, the decrease on the upper surface of the wing produces a decrease in the pressure, and the greater concentration produces an increase of pressure on the lower surface of the wing. The combined action of these effects produces a common resultant or total sustentation force on the wings, and whose point of application and direction is dependent on the wing profile and the angle of attack of the wing.

(2) The sustentation force A is proportional to the square of the speed $v$ of the motion of the plane through the air, and this speed initiates a displacement of the molecules of the air traversed on the upper surface, and under the lower surface of the wing.

(3) However, by virtue of the principle of relativity of movement, it is apparent that to create the sustentation force A, there could also be developed a force which would sustain a conventional airplane in the air of an atmospheric draft, provided the draft moved against and through the profile of the wings, even if the airplane was not moving horizontally with respect to the vertical of any point on the ground. It is to be understood that in such a situation, the airplane should have its power plant in operation, and its controls for flight duly set to prevent the airplane from being dragged along by an opposed air draft, and at the same time allow the development of the sustentation reactions, which are necessary, as reguards the three axes of coordinates generally used for analyzing the movement of an airplane during flight.

Based on the foregoing principles, the invention comprises creating an air draft by means of a suitable aspirating mechanism located within the fuselage in proximity to the rear area thereof, and which draft moves along an inner double aerodynamic profile of the wings and fuselage of the airplane, even when the airplane is stationary on a landing strip or the ground, and this draft produces the initiation of the sustentation force A. In addition the air draf due to its discharge into the atmosphere at the rear upper area of the airplane and in a direction opposed to the line of flight of the airplane allows the actuation of the rudder and elevational assemblies of the airplane when the plane is still on the ground.

The action of sustentation force A permits take-offs and landings to be accomplished at greater inclinations and at less speed than in the case of conventional airplanes.

This in achieved due to the possibility of increasing the "angle of attack" during flight to a much larger degree than in conventional planes without the ultimate danger of stalling as occurs in such planes. This will not occur with the present invention, since the decrease in sustentation effect initiated by the larger "angle of attack" will be compensated for by imparting a greater speed of rotation to the aspirator either automatically through mechanical cotrols or by means of pilot action, and such controls function to increase the value of sustentation force A proportionally to the increase of the "angle of attack," thereby decreasing, at will, the speed of translation without danger of stalling.

Due to the combined action of the sustentation force A developed by the aspirator, and propeller traction force S in combination with forces G (weight) and W (air resistance), there results the effective translation force $F_v$.

It will be appreciated from the foregoing that it is possible to regulate at will the magnitude of the effective speed of translation of the plane in accordance with the power and number of revolutions selected for the power plants regulating the sustentation and traction forces A and S, either during take-off, normal flight or landing.

Further objects and advantages of the invention will become more readily apparent to one skilled in the art from the following detailed description and attached drawings, and in which drawings:

FIG. 6 is a diagrammatic plan view showing the conduits or ducts extending through the wings and fuselage, and communicating with the aspirating means adjacent the tail of the airplane;

FIG. 7 is a vertical sectional view taken through the fuselage duct;

FIG. 8 is a vertical sectional view of an airplane provided with the present invention;

FIG. 9 is a fragmental view, partly in elevation and partly in cross-section, showing the rear retractable wheel and its operating components;

FIG. 10 is a fragmental view on an enlarged scale of the conduit and valve means shown in FIG. 9;

Figure 1:
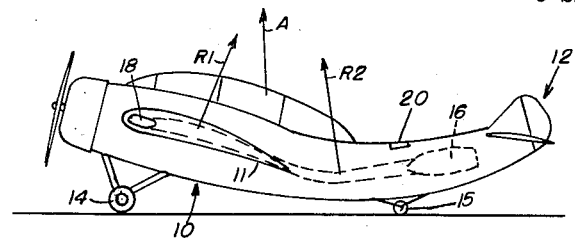
FIG. 1 is a diagrammatic view in side elevation, showing an airplane equipped with the present invention on the ground.
Figure 2:
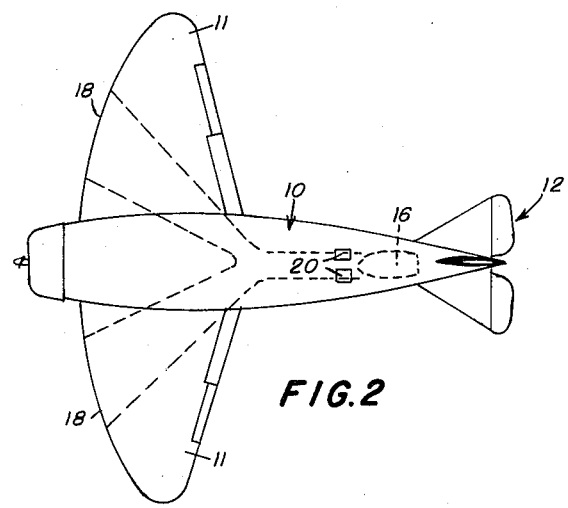
FIG. 2 is a plan view of the airplane illustrated in FIG. 1.

With reference to FIGURES 1 and 2 which generally illustrate the adaptation of the present invention with a small, single engine monoplane, the airplane includes a fuselage 10, wings 11, tail control surfaces 12, propeller 13, front landing wheels 14, and a rear or tail wheels 15. To create the air draft hereinabove mentioned, an aspirating means 16 such as an "Axivane" centrifuge aspirator or equivalent structure is suitably mounted within the fuselage in proximity to the tail control surface 12. The aspirator 16 communicates with a duct 17 provided within the fuselage, which duct in turn communicates with conduit means or ducts 18 provided for the wings 11. The conduit means 18 extend through the wings with the leading ends of such conduit means being located at the leading edge of the wings, and with the opposite ends opening into the duct 17. The air which is drawn through the leading open ends of the ducts 18 for longitudinal movement through the wings and the fuselage may be discharged, if desired, through apertures 20 located symmetrically on each side of the fuselage 10, forwardly of the aspirator 16, as will later be more fully described.

As previously stated, the action of the sustentation force allows take-offs and landings to be effected at greater inclinations, and at lesser speeds than is true of conventional type aircraft. This is due to the fact that stalling is prevented, since the decrease in the sustentation force which is brought about by the larger angle of attack is utilized by imparting a greater speed of rotation to the aspirator through suitable control means, which function to augment the value of the sustentation force in proportion to the increase in the angle of attack of the airplane. This is due to the combined action (see FIGURE 3) of the sustentation force A initiated by the aspirator 16 and the propeller traction force S in conjunction with forces G, namely, weight, and W, namely, air resistance. Consequently, there results the effective translation force $F_v$, and FIGURE 3 indicates clearly the proper points of application, magnitude and direction of these forces, and the resultant translation force $F_v$.

By selection of the power characteristics, a number of R.P.M.'s of the power plants of the engines operating the aspirator 16 and the propeller 13, either during take-off, normal air flight or landing, it is possible for the pilot to regulate, at will, the magnitude of the effective speed of movement of the airplane. Once the airplane has attained the required altitude and speed of flight, it is possible to stabilize the normal cruising speed, without the necessity of operating the aspirator 16, and closing the conduit means for the air intake.

Further essential advantages of the invention are as follows:

(1) To permit a take-off with a large angle of attack and a minimum run.

(2) To permit landing with pronounced inclination toward the ground, and a minimum landing run.

(3) Permits the possibility of segregating the anti-gravity sustentation of the air flow effected by the aspirator from the sustentation action of the wings initiated by the speed of the airplane.

(4) Permits a large increase of the capacity of sustentation per square meter of the outer surface of the wings.

(5) Permits the increase of the inner sustentation force.

(6) Permits the adaptation of the invention to propeller-driven airplanes, as well as jet-propelled airplanes.

(7) Permits the use of the inner area of the wing structure for use as fuel tanks.

(8) Permits an aircraft, whether propeller driven or jet-propelled, to possess a larger capacity of useful load in relation to wing surface as well as total surface.

(9) Permits the airplane to include a greater capacity of carried weight by virtue of the favorable action of the sustentation force against the weight force, thereby enabling the craft to possess a more rounded configuration with much larger useable inner space, and centralize the motive forces into a single power plant, preferably located in the fuselage, in proximity to the point of application of the weight force G.

(10) To permit the propelling components of the aspirator to function as traction or propulsion propellers from the airplane.

Figure 5:
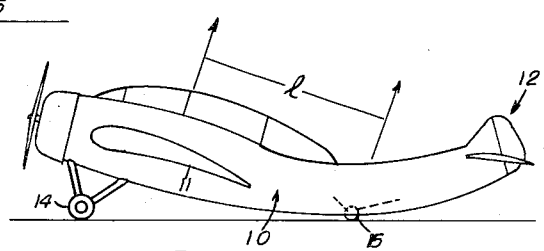

In order to enable the plane to take off at the large angle of attack, and with a minimum run, the rear wheel assembly 15 is made retractable, and includes automatic means for folding or retracting the rear wheel supporting mechanism. Such automatic means operates in synchronism with the power plant for the aspirator 16, so that when the aspirator starts to operate and gradually increases its R.P.M.'s, the rear wheel 15 will be retracted to the position shown in FIGURE 5, so that the airplane is supported by the front wheels and the retracted rear wheel 15. The wheel 15 remains in the FIGURE 5 position when the aspirator attains its greatest capacity of aspiration, i.e. maximum value of sustentation force A, and the component A(2) (FIGURE 3) of the sustentation force A developed by the action of the air draft actuates on the ground center of pressure which is located forwardly of the center of gravity G, and the substantial "lever arm" A1 will assist the plane in assuming the position shown in FIGURE 5. At this particular time, the plane will be in condition to operate with the propeller at full power, and thus start its take-off with a minimum run on the landing strip. To compensate for any effect produced by the change in the inclination of the plane, the seats for the pilot and passengers or other occupants will be inclined proportionately and automatically in the reverse direction.

To enable the airplane to land with a pronounced inclination in the direction of the landing strip, the sustentation force A being increased at full value and combined with the plane's own sustentation initiated by virtue of an elevated angle of attack and at a moderate propeller force, in such a manner that it will be feasible to accomplish safe landings at a minimum speed with a minimum run. To effect such ends, at the time of landing, the supporting mechanism for the rear wheel 15 should be extended to the maximum, the aspirator functioning at full power, the elevator completely down, together with a substantial zero speed of the propeller, the ailerons elevated, and when the plane nears ground level the sustentation force should be reduced gradually and steadily to zero, with the angle of attack being reduced for allowing weight force G to function when leaving ground level, and at the same time effect a minimum speed which will be absorbed by the wheels 14 and 15.

The sustentation force A initiated by the aspirator drawing air through the plane but being independent from the sustentation action of the wings effected by the plane speed, permits the pilot to take advantage, at will, of such independence by actuating the speed of the aspirator 16. Consequently, with the airplane in normal flight, that is to say, in horizontal flight at a uniform speed, it is possible to reduce a horizontal forward speed to minimum values as compared with present planes, without causing the plane to lose altitude.

Inasmuch as the wings present an active outer aerodynamic surface during flight, as well as a further inner active aerodynamic surface during functioning of the aspirator, it is possible to provide a large increase of the capacity of sustentation per square meter of the outer surface of the wings, without increasing such wing outer surface.

Since the air draft effected by the aspirator 16 functions not only on the inner surface of the wings, but on the fuselage along the line corresponding to lines $a$, $b$, $c$ and $d$, as shown in FIGURE 1, there is thus increased the inner sustentation surface, thereby augmenting the total load possible for a predetermined degree of the wing surface.

Referring more particularly to FIGURES 8 and 9, and which figures illustrate a single engine airplane, 100 indicates a fuselage, 101 wings, 102 tail control surfaces, 103 a propeller, 104 a tail aspirator, 104a an electric motor, 105 front landing wheels, and 106 generally a rear, retractable landing wheel assembly.

A plurality of tubes or ducts 107 constituting a circular ring of general truncated, conical configuration surrounds the nose and leading ends 108 of the ducts communicate with the atmosphere, while trailing ends 109 communicate with the interior of the wings, with the tubes or ducts functioning to draw air into the wings due to the rotation of the propeller while the aircraft is still on the ground, thereby diminishing the weight of the airplane while the same is still on the ground for facilitating take-off.

The wings 101 are of special construction and include an upper outer section 110, and a lower outer profile section 111, the section 110 being generally convex and the section 111 being concave, to thereby provide the necessary airfoil surface. Mounted within the wing 101 is an air foil section 112 of lesser area, likewise defined by upper surface 113 and lower surface 114. The airfoil section 112 may be suitably secured to the inner face of the upper and lower surfaces of the wing 101, and there is provided a space 115 between the inner faces of the upper and lower surfaces 110 and 111, and the upper and lower surfaces of the airfoil section 112, which permits air drawn through the ducts 107 into the wing by the action of the tail aspirator 104 to follow the path shown in FIGURE 9. The airfoil section 112 is hollow and can be used to provide a fuel tank 116. The above-described structure of the wings 101 performs two functions. Firstly, the wing structure will counterbalance the greater weight of the rear portion of the fuselage, and secondly, maintain the fuel within the tank 116 refrigerated, since the air stream developed by the aspirator 104 will surround the fuel tanks 116, thus maintaining such tanks at a temperature lower than the temperature normally present in conventional aircraft.

The airstream will be drawn into each wing 101 and is sub-divided into two layers L and L' (FIG. 9) with layer L so functioning on section 110 that the same may be termed a surface of high pressure. The surface 113 of airfoil section 112 will be subjected to negative pressure by the airstream and thus such surface may be termed a surface of low pressure.

The layer L' acts on lower surface 114 of the airfoil section 112 such that such surface is one of high pressure and the section 111 of low pressure. By virtue of the combined action of these pressures, it will be appreciated that with the airplane on the ground or in flight and with the aspirator 104 in operation, there will be produced on each of the above-mentioned surfaces a resultant force, the lifting effect of which will be equal to the effect of the three other resultants with the final result producing a sole component $R_1=R$ which is also joined by the usual lifting effect of the air on the outer surfaces of the wings 101.

The inner ends of the spaces 115 communicate with a duct or channel 117 formed in the fuselage 100, and which duct or channel leads to the aspirator 104. The channel may be secured within the fuselage by fastening components 118 of any suitable and convenient type. The channel 117 is defined by upper and lower concavo-convex surfaces 119 and 120 (FIG. 7) with the surface 119 being a surface of high pressure and surface 120 a surface of low pressure. The joint action of such pressures caused by the airstream flowing through the channel from the wings will produce in the rear part of the fuselage the resultant $R_2$ which acts on the interior of the fuselage. The resultant $R_2$ will have a direction somewhat inclined to the nose of the airplane (FIG. 1) as a result of being perpendicular to the mean longitudinal axis of the rear part of the fuselage which is inclined upwardly to the tail control surfaces as shown in FIGS. 1 and 8.

In lieu of the surfaces 119 and 120 illustrated, the channel may be of double profile generally similar to the wing of arrangement, but in order to afford greater space facilities for cargo, passengers, etc., it is preferable to construct the channel 117 as shown.

As a final result of the action of the components $R_1$ and $R_2$, there is achieved the force A which must be located a point closely adjacent the center of gravity of the airplane when the plane is in flight and with the aspirator in operation. The action of the force A will effect a steady antigravitational sustaining function on the plane during flight and even at low cruising speeds.

Figure 3:
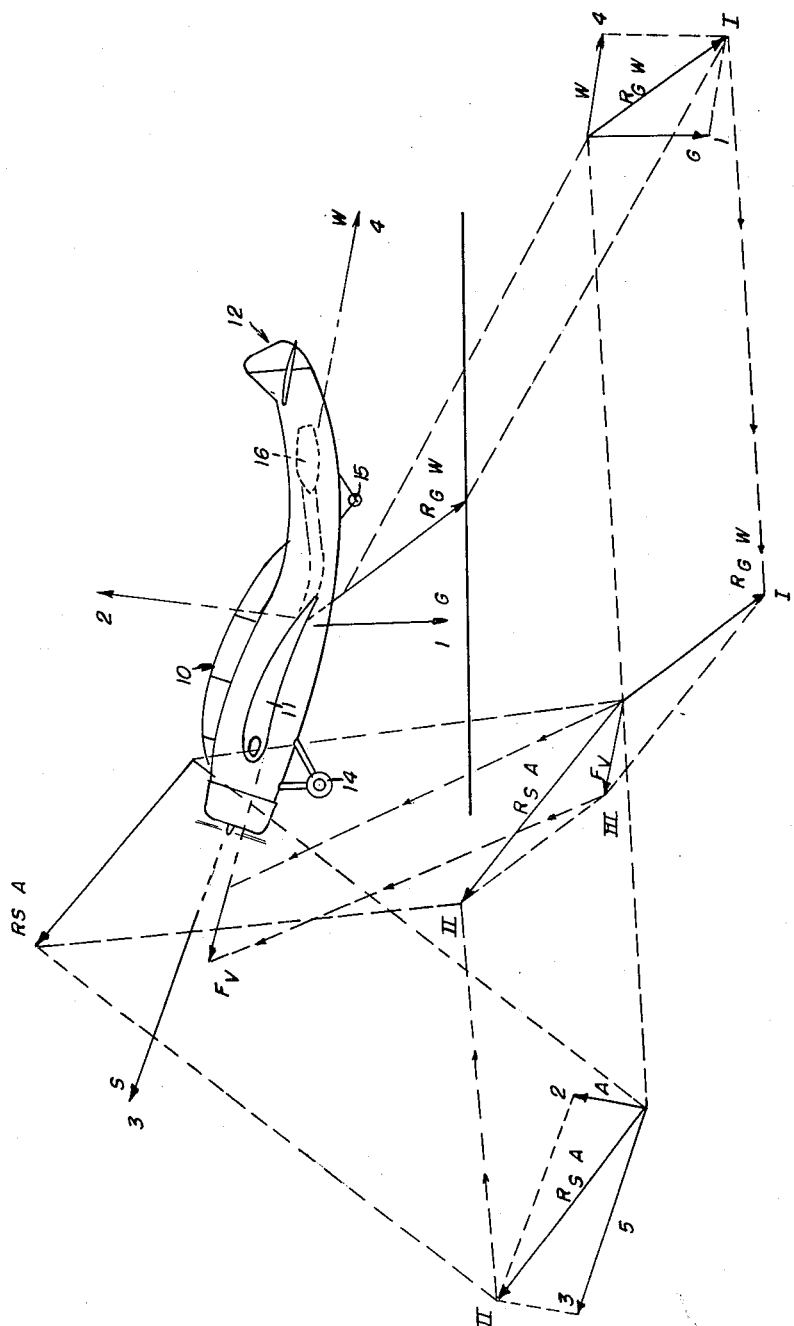
FIG. 3 is a diagrammatic view in side elevation, showing the airplane during a take-off operation and the probable points of application, magnitude and direction of the sustentation force, the traction force, weight and air resistance forces resulting in translation movement of the airplane.

In order to explain fully the forces which operate on the airplane, reference is made to FIG. 3.

In this particular figure:
1=$G$, the total weight of the plane,
2=$A_{(R)}$, the total sustaining effect,
3=$S$, the traction effect of the propeller, and
4=$W$, the total resistance to forward movement caused by the air.

1=1+4=$R(G+W)$, the total negative resistance due to the atmosphere and weight opposed to the forward movement, II=2+3=$R_{(S+A)}$, total positive traction effect obtained by the combined results of the propeller and the total sustaining effect, and III=I+II=$F_V$, the forward force in the same position and direction of the line of flight.

Figure 11:
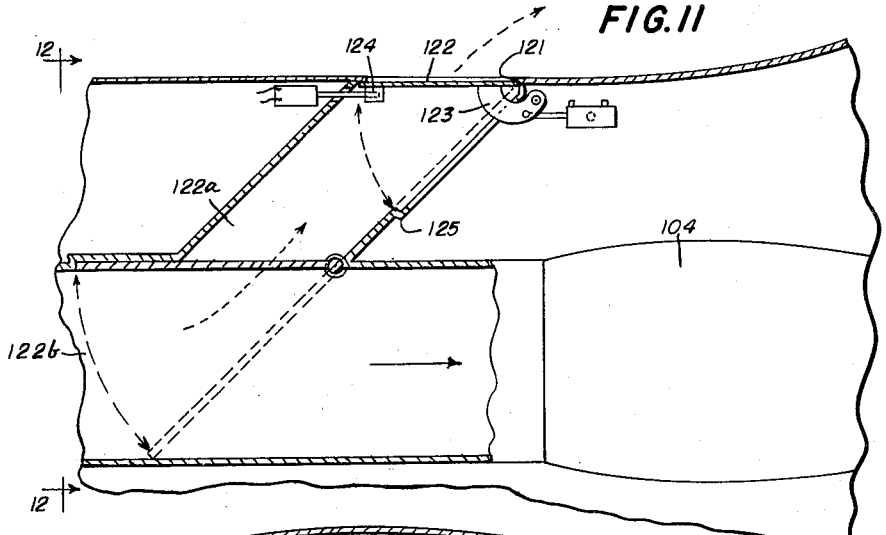
FIG. 11 is a fragmental view in cross-section of the rear part of the airplane illustrating the cover means for the conduit or duct means.
Figure 12:
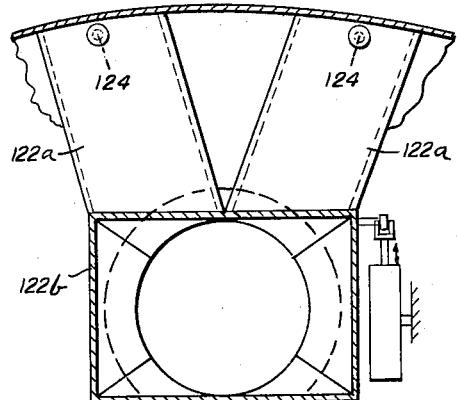
FIG. 12 is a view along line 12—12 of FIG. 11, the view looking in the direction of the arrows.
Figure 13:
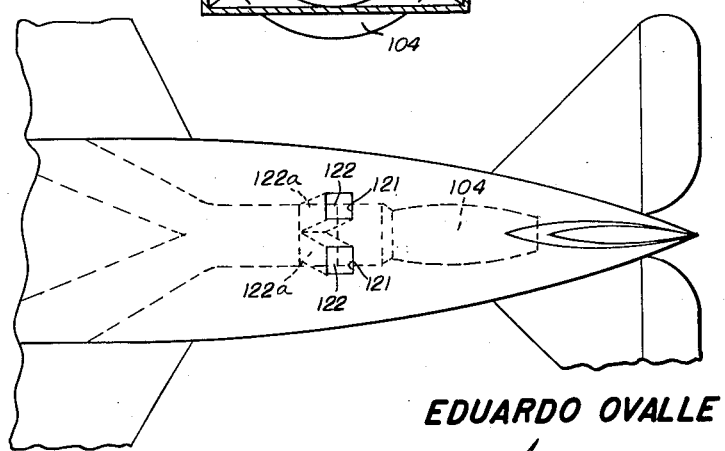
FIG. 13 is a plan view on a reduced scale of FIG. 11.

The apertures 20 referred to in FIG. 1 and shown at 121 in FIGS. 11 and 12, are adapted to be closed by suitable means. Such closing means comprises a cover component 122 of such contour as to conform to the shape of the surface of the fuselage. It will be noted that the apertures are located a short distance forwardly of the first row of blades of the aspirator so that when the aspirator is not operating the air flowing through the wings and fuselage may be discharged into the atmosphere.

The cover component 122 is mounted on hinge 123 which permit the cover component to swing downward when a latch or fastener 124 is released. The cover component is counterweighted, and its downward swinging movement is limited by a stop 125.

As shown, the component 122 includes sections 122a, one for each aperture, and such sections are joined to a single lower part 122b. The lower part 122b may be raised and lowered by a cylinder and piston assembly (not shown) operated by compressed air. If the pilot, after having stabilized the airplane for horizontal flight, desires to utilize the upward component produced by the air on the inner surfaces of the wings and fuselage and with the aspirator not functioning, the cover component sections 122a are opened for allowing the air to escape through the apertures 121.

With respect to the front and rear wheel assemblies 14 and 15 (FIGS. 4 and 5), respectively, such front wheel assembly can be of any suitable type, although the assembly 15 is of special construction. The rear wheel assembly is best illustrated in FIGS. 8 and 9.

The rear wheel assembly is indicated 130 in FIGS. 8 and 9, and the same includes four wheels and the pneumatic tires of each wheel must be such that the tire can support a weight of about 2,750 lbs., or one-fourth of the overall weight assumed for a single engine airplane. Each wheel includes a strut 131 pivoted at its upper end to a shock absorbing unit 132 mounted on the fuselage at about the trailing edge of the wings 101. A wheel 133 having a pneumatic tire is suitably mounted at the lower end of the strut, and extending angularly upward from the strut is a leg or rod 134. Mounted within the fuselage are twin cylinders 135 and 136, with pistons 137 and 138, respectively, being connected in tandem by a connecting rod 139. The upper end of leg 134 is slidably disposed in cylinder 135 by guide means 140 located on the pressure face side of piston 137. Manifestly, inward movement of such pistons will retract the leg so that the wheel 133 will assume the position depicted in FIG. 5, whereas outward movement will extend the leg to assume the FIG. 4 position.

A small electrically driven air compressor 140' is supported in the fuselage below the wings, and the compressor is of a two-stage, rotative type which will draw air moving through space 115 in the wings through conduit means 141, compress such air and discharge it through line 142 and store the same in a small receiver 143. A conduit 144 leads from the receiver 143 to valve means 145, which controls branch pipes 146 and 147 in communication with the cylinder 136, on the opposite side of its piston. One end of the conduit 144 opens into the channel of the fuselage, and governor controlled valve 148, and manually or otherwise operated valve 149 are positioned in the conduit 144 on the upstream and downstream sides of the branch pipes. A second conduit 150 leads from the receiver 143 to a diesel motor which can be used as the primary power source for operating the propellers, various electric motors, and the aspirator 104.

A light weight cylinder 151 is supported within the channel leading to the aspirator 104, and mounted in proximity to the forward end thereof is a bladed wheel 152. Shaft 153 of the wheel 152 carries a bevel gear 154 meshing with bevel gear 155, with the latter gear being connected to a centrifugal governor 156 of the ball type. The governor balls are attached to telescopic rods 157, which rods are also operably associated with the valve assembly 148. A control valve 158 in the conduit 144 downstream of the receiver is adapted to control the airflow between the receiver and the rear end of the conduit.

It will be noted that the forward end of the cylinder 151 is provided with a conical cover 159 which is rotatable relative to the cylinder, and which rotary movement can be controlled by the pilot through suitable means (not illustrated). The cover is so constructed that open sectors thereof may be opened or closed so that the bladed wheel and governor may be actuated by the airstream flowing through the wings and fuselage channel when the cover is in an open position.

With respect to the air compressor, the same compresses the air drawn from the interior of the wings to 60 p.s.i. for storage in the receiver 143. The receiver has a capacity of approximately 30 liters, and the air pressure and capacity of the receiver are such as to accomplish the following results:

(1) to sustain on the ground with the tail elevated, the overall weight of the rear half of the airplane, (2) with the airplane being on the ground, and with the wheel retracted such as to elevate the rear portion of the airplane for facilitating parking of the airplane, (3) to accomplish lowering of the wheel during approach to the landing strip prior to landing, and resist impact at low speed with sufficient capacity to support the same smoothly, regardless of the great angle of attack of the airplane, since the rear wheels will engage the ground prior to the front wheels, and (4) supply air to the diesel motor.

Figure 4:
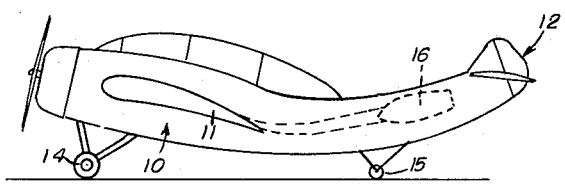
FIGS. 4 and 5 are views in side elevation, showing the rear retractable wheel in extended and retracted positions, respectively.

The cylinders 135 and 136 are also provided with valves 160, 161, 162, 163, 164 and 165 for admitting or exhausting air as required. The valve 149, when closed, and with the valve 158 open, will allow air to flow through conduit 144, valve 145, branch pipe 146, whereby piston 138 is moved to the left (FIG. 9) and through its connection to piston 137 moves leg 134 outwardly, thus lowering wheel 133 to effect elevation of the rear part of the plane, as shown in FIGURE 4. On the other hand, if the valve is manipulated to introduce the air through the conduit 147, the piston 138 will be moved to the right which, of course, will retract the leg so that the wheel will assume the FIGURE 5 position.

After the plane has completed its run for take-off, the same will be in a steady position, with the wheel 133 extended to its maximum position. The aspirator is then caused to function at its maximum speed, with the air drawn through the space 115, and the conduit 117 which tends to move the rear part of the plane to the FIGURE 5 position which, of course, is opposed by the air in the cylinder 135. However, at this time, with the cover of the cylinder 151 opened, the governor 156 starts to function, by virtue of the bladed wheel 152 and associated bevel gearing, thereby actuating the valve 148, allowing the compressed air to be passed, and with valve 149 closed, the air will enter branch pipe 147, so that the wheel can be retracted, with such action being accomplished in a smooth and slow condition. Air can escape through valve 161 to the atmosphere and valve 163 to the interior of the cylinder 136, when valve 164 is uncovered by the piston during its upward movement. With the wheel 133 thus being lowered smoothly to the position shown in FIGURE 5, the plane is ready for take-off at maximum power of the motor of the airplane.

It is believed that in a landing operation it will be readily apparent that the foregoing cycle would be reversed for efficient and safe landing.

While the invention has been described with particular application to a single engine aircraft, it is to be understood that the principles thereof may be applied to multi-engine planes, and in which situation it may be more advisable to locate the engines at the trailing edges of the wings, so that the action developed by the propellers does not interfere in any way with the draft produced by the aspirator.

The invention is not to be confined to the precise showings illustrated in the drawings, but changes or modifications may be made therein, so long as such changes or modifications mark no material departure from the spirit and scope of the appended claims.

I claim:

1. In an airplane having a fuselage, wings of airfoil cross-section, tail control surfaces, propulsion means and means for improving the flight characteristics of the airplane, such last-named means including an airfoil body of lesser cross-sectional area than that of the wings supported within and extending substantially from the fuselage to the tip of each wing for providing a first channel between the upper surface of the airfoil body and the inner upper surface of the wing and a second channel between the lower surface of the airfoil body and the inner lower surface of the wing, means defining a conduit within said fuselage extending axially thereof and with which said first and second channels communicate, said conduit terminating adjacent to and forward of said tail control surfaces, means for introducing air into the wings adjacent the leading edge thereof, and aspirating means in the fuselage in operative relationship to said conduit for drawing air through said leading edge of the wings whereby the airfoil body divides the air into two streams passing through said first and second channels, respectively, for subjecting the inner upper and lower wing surfaces to the combined action of high and low pressures for imparting a lifting force to the wings in addition to the lifting effect of the air on the upper and lower outer surfaces of the wing with such air streams merging and passing through said conduit in the direction of the tail control surfaces so that the air stream initiates a vertical force of sustentation counterbalancing the weight of the airplane.

2. The airplane as claimed in claim 1, further including means located symmetrically on each side of the fuselage forwardly of the aspirating means constituting apertures through which the airstream passing through the conduit may be discharged, and means cooperable with said apertures for closing the same.

3. The airplane as claimed in claim 1, in which said conduit includes upper and lower concave-convex surfaces with said upper surface being a surface of high pressure and said lower surface being a surface of low pressure.

4. In an airplane having a fuselage, wings, tail control surfaces, propulsion means and means for improving the flight characteristics of the airplane, such last-named means including a body of lesser cross-sectional area than that of the wings supported within each wing for providing a first channel between the upper surface of the body and the inner upper surface of the wing and a second channel between the lower surface of the body and the inner lower surface of the wing, means defining a conduit within said fuselage extending axially thereof and with which said first and second channels communicate, said conduit terminating adjacent to and forward of said tail control surfaces, means for introducing air into the wings through the leading edge thereof, and aspirating means in the fuselage in operative relationship to said conduit for drawing air through said leading edge of the wings whereby the body divides the air into two streams passing through said first and second channels, respectively, for subjecting the inner upper and lower wing surfaces to the combined action of high and low pressures for imparting a lifting force to the wings in addition to the lifting effect of the air on the upper and lower outer surfaces of the wing with such air streams merging and passing through said conduit in the direction of the tail control surfaces so that the airstream initiates a vertical force of sustentation counterbalancing the weight of the airplane.

References Cited in the file of this patent

UNITED STATES PATENTS

| | | |
|---|---|---|
| 1,624,475 | Coe | Apr. 12, 1927 |
| 2,584,198 | Loveland | Feb. 5, 1952 |
| 2,807,428 | Wibault | Sept. 24, 1957 |

FOREIGN PATENTS

| | | |
|---|---|---|
| 559,214 | France | June 11, 1923 |